United States Patent
Bitter (10) Patent No.: US 10,233,950 B2
(45) Date of Patent: Mar. 19, 2019

(54) HYDRAULIC CONTROL SYSTEM AND METHOD

(71) Applicant: Caterpillar Global Mining LLC, Oak Creek, WI (US)

(72) Inventor: Marcus Bitter, Dortmund (DE)

(73) Assignee: Caterpillar Global Mining LLC, Tucson, AZ (US)

( * ) Notice: Subject to any disclaimer, the term of this patent is extended or adjusted under 35 U.S.C. 154(b) by 217 days.

(21) Appl. No.: 15/116,236

(22) PCT Filed: Feb. 3, 2015

(86) PCT No.: PCT/US2015/014182
§ 371 (c)(1),
(2) Date: Aug. 3, 2016

(87) PCT Pub. No.: WO2015/119912
PCT Pub. Date: Aug. 13, 2015

(65) Prior Publication Data
US 2017/0009784 A1     Jan. 12, 2017

(30) Foreign Application Priority Data
Feb. 7, 2014   (EP) .................................... 14154376

(51) Int. Cl.
*F16H 61/448* (2010.01)
*F15B 13/042* (2006.01)
(Continued)

(52) U.S. Cl.
CPC ........ *F15B 13/0426* (2013.01); *E02F 9/2267* (2013.01); *E02F 9/2285* (2013.01);
(Continued)

(58) Field of Classification Search
CPC ...... F16H 61/431; F16H 61/433; F16H 61/44; F16H 61/444; F16H 61/448; F16H 61/47; F15B 13/0246; F15B 20/007
(Continued)

(56) References Cited

U.S. PATENT DOCUMENTS 3,987,626 A   10/1976   Bianchetta
6,205,780 B1   3/2001   Zervas
(Continued)

FOREIGN PATENT DOCUMENTS

CN   103228932   7/2013
DE   4016518     9/1991
(Continued)

OTHER PUBLICATIONS

Machine Translation of JP54028970.*
European Search Report dated Jul. 16, 2014.
International Search Report dated Apr. 10, 2015.

*Primary Examiner* — F Daniel Lopez
*Assistant Examiner* — Daniel S Collins (57) ABSTRACT

A hydraulic control system may include a closed loop hydraulic circuit with at least one hydraulic motor. A plurality of variable displacement pumps may be fluidly connected in parallel in the closed loop hydraulic circuit. A plurality of hydraulic actuators may be configured to adjust the displacement of the variable displacement pumps. A pilot valve assembly may be configured to supply the hydraulic actuators with hydraulic fluid having a pilot pressure corresponding to a desired displacement of the variable displacement pumps. A pressure regulating device may be configured to limit the pilot pressure of the hydraulic fluid supplied to the hydraulic actuators when a working pressure in the closed loop hydraulic circuit reaches a maximum allowable working pressure.

17 Claims, 4 Drawing Sheets (51) Int. Cl.
*F15B 11/08* (2006.01)
*F16H 61/44* (2006.01)
*F15B 11/028* (2006.01)
*F15B 20/00* (2006.01)
*E02F 9/22* (2006.01)

(52) U.S. Cl.
CPC .......... *E02F 9/2289* (2013.01); *E02F 9/2296* (2013.01); *F15B 11/028* (2013.01); *F15B 11/08* (2013.01); *F15B 20/007* (2013.01); *F15B 2211/20507* (2013.01); *F15B 2211/20553* (2013.01); *F15B 2211/20561* (2013.01); *F15B 2211/20576* (2013.01); *F15B 2211/2656* (2013.01); *F15B 2211/27* (2013.01); *F15B 2211/50518* (2013.01); *F15B 2211/6355* (2013.01); *F15B 2211/6652* (2013.01); *F15B 2211/67* (2013.01); *F15B 2211/7058* (2013.01); *F16H 61/44* (2013.01); *F16H 61/448* (2013.01)

(58) Field of Classification Search
USPC .......................................................... 60/445
See application file for complete search history.

(56) References Cited

U.S. PATENT DOCUMENTS

| | | | |
|---|---|---|---|
| 8,776,512 B2 * | 7/2014 | Lastre | B60T 7/12 60/436 |
| 2008/0034746 A1 | 2/2008 | Verkuilen | |
| 2012/0124988 A1 * | 5/2012 | Nelson | F16H 61/4035 60/445 |
| 2013/0098014 A1 | 4/2013 | Kuehn et al. | |
| 2013/0098018 A1 | 4/2013 | Knussman | |

FOREIGN PATENT DOCUMENTS

| | | | | |
|---|---|---|---|---|
| DE | 4118869 | | 12/1992 | |
| DE | 4420704 | | 12/1995 | |
| DE | 19626793 | | 6/1997 | |
| EP | 0028448 | | 5/1981 | |
| EP | 0056865 | | 12/1981 | |
| JP | 54028970 | * | 3/1979 | ............. F15B 11/02 |
| WO | WO 2006/069625 | | 7/2006 | |

* cited by examiner

HYDRAULIC CONTROL SYSTEM AND METHOD

CLAIM FOR PRIORITY

This application is a U.S. National Phase entry under 35 U.S.C. § 371 from PCT International Application No. PCT/US2015/014182, filed Feb. 3, 2015, which claims benefit of priority of European Patent Application No. 14154376.9, filed Feb. 7, 2014, all of which are incorporated herein by reference.

TECHNICAL FIELD

The present disclosure generally relates to a hydraulic control system and method, in particular, to a system and method for operating a plurality of variable displacement pumps in a closed loop hydraulic circuit.

BACKGROUND

Hydraulic machines, for example, hydraulic excavators, use engines to drive hydraulic pumps, which in turn provide hydraulic power to a plurality of hydraulic circuits of the hydraulic machines. Each hydraulic circuit may include one or more actuators, for example, hydraulic cylinders and/or hydraulic motors. The plurality of hydraulic actuators each may require a flow of hydraulic fluid from one or more hydraulic pumps to operate the associated hydraulic cylinders or hydraulic motors. The amount of flow required by each hydraulic actuator may vary depending on an operator input. The hydraulic pumps may be controlled to supply the hydraulic system with the hydraulic flow required by each of the plurality of hydraulic actuators.

In some systems, the plurality of hydraulic circuits include a closed loop hydraulic circuit. The closed loop hydraulic circuit may include one or more hydraulic motors supplied with the required flow by a plurality of variable displacement pumps fluidly connected in parallel in the closed loop hydraulic circuit. Various control systems have been implemented to control the plurality of variable displacement pumps in the closed loop hydraulic circuit.

The disclosed systems and methods are directed at least in part to improving known systems.

SUMMARY OF THE DISCLOSURE

In one aspect, the present disclosure relates to a hydraulic control system. The hydraulic control system comprises a closed loop hydraulic circuit including at least one hydraulic motor. A plurality of variable displacement pumps are fluidly connected in parallel in the closed loop hydraulic circuit and configured to supply the at least one hydraulic motor with pressurized hydraulic fluid. A plurality of hydraulic actuators, each of which is associated with one of the plurality of variable displacement pumps, is configured to adjust the displacement of the associated variable displacement pumps. A pilot valve assembly is configured to supply each of the plurality of hydraulic actuators with hydraulic fluid having a pilot pressure corresponding to a desired displacement of each of the plurality of variable displacement pumps. A pressure regulating device is configured to limit the pilot pressure of the hydraulic fluid supplied to the plurality of hydraulic actuators when a working pressure of hydraulic fluid in the closed loop hydraulic circuit reaches a maximum allowable working pressure.

In another aspect of the present disclosure, a machine comprises an engine and a hydraulic control system. The hydraulic control system comprises a closed loop hydraulic circuit including at least one hydraulic motor. A plurality of variable displacement pumps are fluidly connected in parallel in the closed loop hydraulic circuit and configured to supply the at least one hydraulic motor with pressurized hydraulic fluid. A plurality of hydraulic actuators, each of which is associated with one of the plurality of variable displacement pumps, is configured to adjust the displacement of the associated variable displacement pumps. A pilot valve assembly is configured to supply each of the plurality of hydraulic actuators with hydraulic fluid having a pilot pressure corresponding to a desired displacement of each of the plurality of variable displacement pumps. A pressure regulating device is configured to limit the pilot pressure of the hydraulic fluid supplied to the plurality of hydraulic actuators when a working pressure of hydraulic fluid in the closed loop hydraulic circuit reaches a maximum allowable working pressure. The plurality of variable displacement pumps are configured to be powered by the engine.

In yet another aspect of the present disclosure, a method of operating a plurality of variable displacement pumps, the plurality of variable displacement pumps being fluidly connected in parallel in a closed loop hydraulic circuit and configured to supply at least one hydraulic motor with pressurized hydraulic fluid, comprises supplying each of a plurality of hydraulic actuators associated with the plurality of variable displacement pumps with hydraulic fluid having a pilot pressure corresponding to a desired displacement of each of the plurality of variable displacement pumps. The method further comprises limiting the pilot pressure of the hydraulic fluid supplied to the plurality of hydraulic actuators when a working pressure of hydraulic fluid in the closed loop hydraulic circuit reaches a maximum allowable working pressure.

Other features and aspects of the present disclosure will be apparent from the following description and the accompanying drawings.

DETAILED DESCRIPTION

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as a limiting description of the scope of protection. Rather, the scope of protection shall be defined by the appended claims.

The present disclosure may be based in part on the realization that, when a plurality of variable displacement pumps are fluidly connected in parallel in a closed loop hydraulic circuit, it is necessary to control the plurality of variable displacement pumps in a synchronous manner. Therefore, it is necessary to simultaneously vary the displacement of the plurality of variable displacement pumps, preferably in a simple and cost-efficient manner.

In addition, the present disclosure may be based in part on the realization that it is necessary to assure that the pressure of the hydraulic fluid discharged by each of the plurality of variable displacement pumps does not exceed a prescribed system pressure that may damage the hydraulic system. In this respect, it is advantages to provide a device that simultaneously limits a pilot pressure for each of the plurality of variable displacement pumps to achieve a system that is not too complex and easy to install and maintain.

Further, the present disclosure may be based in part on the realization that a simple configuration of the control system for the plurality of variable displacement pumps may be achieved when actuators for adjusting the displacement of the pumps are directly controlled by receiving hydraulic fluid with a pilot pressure that corresponds to a desired displacement of each of the variable displacement pumps. Advantageously, the supply of pilot hydraulic fluid to each actuator may be limited based on a received system pressure of the closed loop hydraulic circuit using a single pressure regulating device for all of the variable displacement pumps.

Figure 1:
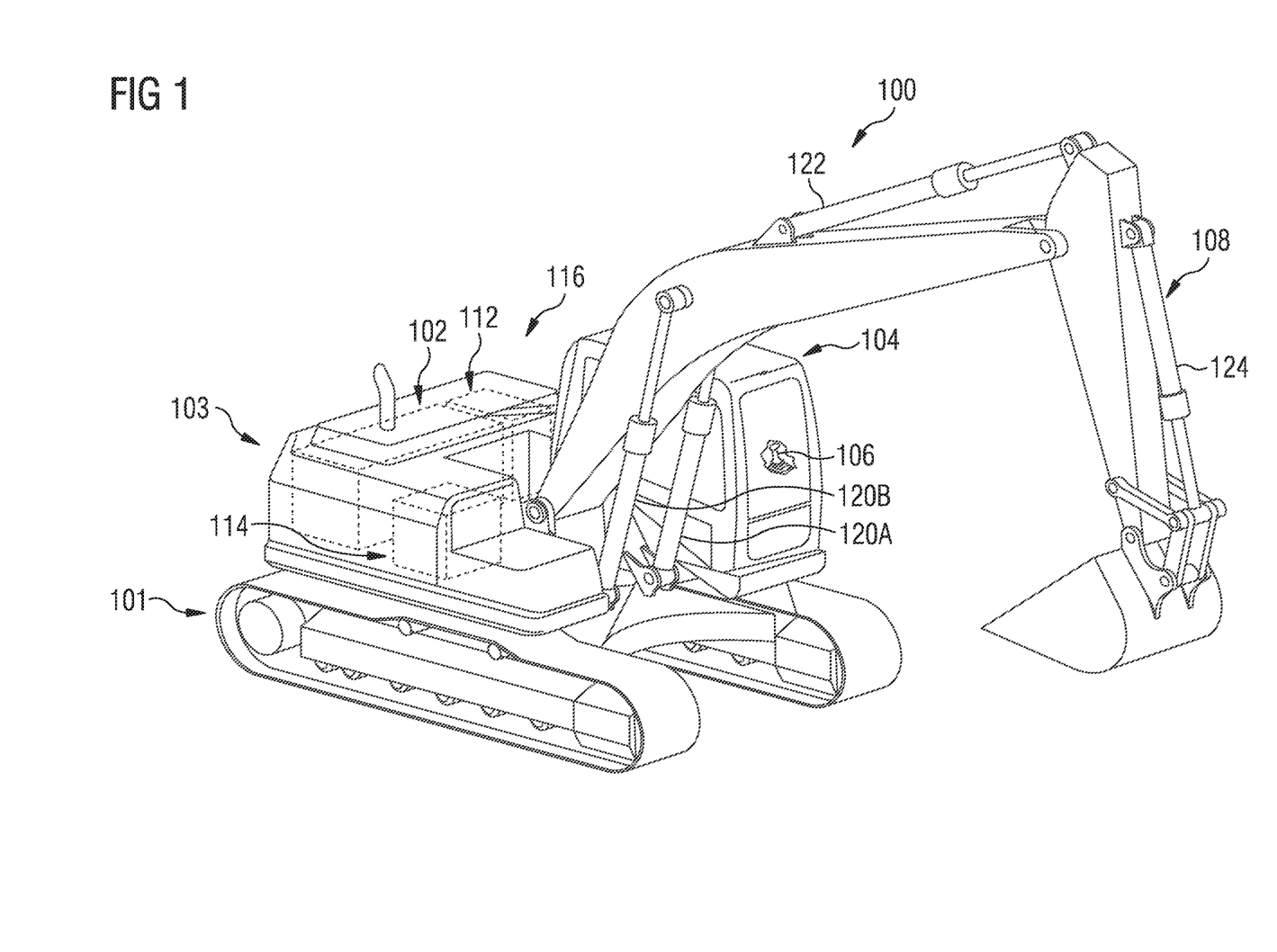
FIG. 1 is a schematic illustration of a machine in accordance with an exemplary embodiment of the present disclosure.

Referring now to the drawings, an exemplary embodiment of a machine 100 is schematically shown in FIG. 1. Machine 100 may be a hydraulic excavator, for example, a large mining excavator, or any other work machine that includes a hydraulic system with a closed loop hydraulic circuit. Machine 100 includes an engine 102. Engine 102 may provide power for machine 100 and its various components. Suitable engines may include gasoline powered engines, diesel powered engines, electrically powered engines or any combination of different types of engines. In one embodiment, engine 102 may be a diesel engine that generates and transfer power to other components of machine 100 through a power transfer mechanism, for example, a shaft or gearbox (not shown). Engine 102 may produce a mechanical power output that may be converted to hydraulic power, for example, by one or more pumps powered by engine 102.

Machine 100 may further include an operator station or cab 104 containing controls for operating machine 100, for example, an input device 106. Cab 104 may be part of a superstructure 103 rotatably mounted on an undercarriage 101 of machine 100. Input device 106 may be embodied as joysticks, levers, buttons, and the like and may be operatively connected to a hydraulic system 108 of machine 100.

In some embodiments, cab 104 may further include interfaces such as a display for conveying information to an operator, and may include a keyboard, a touch screen or any other suitable mechanism for receiving an input from an operator to control or operate machine 100, hydraulic system 108 and/or other machine components. Alternatively or additionally, an operator may be located outside of cab 104 and/or some distance away from machine 100 and may control machine 100, hydraulic system 108 and/or other machine components remotely.

Hydraulic system 108 may include fluid components such as, for example, hydraulic actuators or cylinders, tanks, valves, accumulators, orifices and other suitable components for producing a pressurized flow of hydraulic fluid. Hydraulic system 108 may further comprise fluid sources, for example, one or more tanks and/or a reservoir 112, and one or more hydraulic pumps, which may include variable displacement pumps, fixed displacement pumps, variable delivery pumps or other suitable pressurizing systems. The hydraulic pumps may be drivably connected to engine 102, or may be indirectly connected to engine 102 via a gear mechanism or the like. It is also contemplated that hydraulic system 108 may include multiple sources of pressurized fluid interconnected to provide hydraulic fluid for hydraulic system 108.

Hydraulic system 108 may include a plurality of hydraulic actuators, for example, hydraulic actuators 120A, 120B for operating a boom of machine 100, a hydraulic actuator 122 for operating a stick of machine 100, a hydraulic actuator 124 for operating a bucket of machine 100, one or more hydraulic motors, for example, a hydraulic motor 130 (see FIG. 2) for operating a swing mechanism of machine 100, and hydraulic motors associated with a left propel drive and a right propel drive of machine 100. The swing mechanism may be operable to rotate superstructure 103 with respect to undercarriage 101 of machine 100. It should be appreciated that in other embodiments different numbers of hydraulic motors and/or hydraulic actuators may be provided for the different hydraulic circuits.

Hydraulic system 108 further includes a hydraulic control system 116 for operating hydraulic motor 130, which will be described in more detail below.

Machine 100 also includes a control unit 114 suitable for controlling hydraulic system 108 and other components of machine 100, for example, hydraulic control system 116. Control unit 114 may be operatively connected to input device 106 and may be adapted to receive an input from an operator indicative of a desired movement (or a desired velocity) of machine 100 or an implement of machine 100, for example, the swing mechanism of machine 100, and thus may determine a power demand associated with each hydraulic actuator or motor of hydraulic system 108 for performing the desired movements.

Control unit 114 may include one or more control modules (for example, ECMs, ECUs, etc.). The one or more control modules may include processing units, a memory, sensor interfaces and/or control interfaces for receiving and transmitting signals. The processing units may represent one or more logic and/or processing components used by the system according to the present disclosure to perform various communications, control and/or diagnostic functions. The one or more control modules may communicate to each other and to other components within and interfacing control unit 114 using any appropriate communication mechanisms, for example, a CAN bus.

Further, the processing units may be adapted to execute instructions, for example, from a storage device such as a memory. The one or more control modules may each be responsible for executing software code for hydraulic control system 116 and/or other components of machine 100. The processing units may include, for example, one or more general purpose processing units and/or special purpose units (for example, ASICs, FPGAs, etc.). In some embodiments, the functionality of the processing units may be embodied in an integrated microprocessor or microcontroller, including an integrated CPU, a memory, and one or more peripherals.

Figure 2:
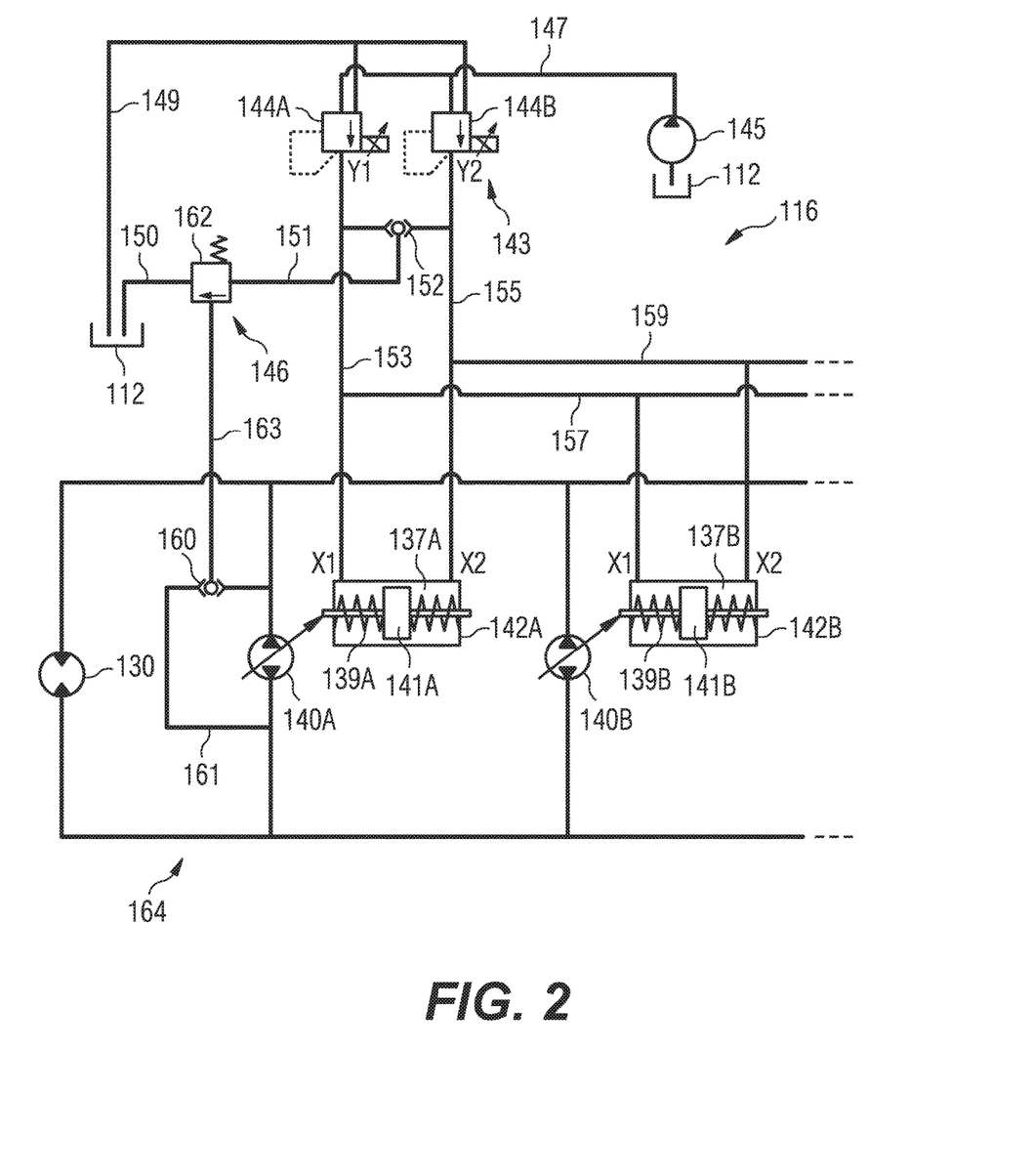
FIG. 2 schematically illustrates a hydraulic control system in accordance with an exemplary embodiment of the present disclosure.

Referring now to FIG. 2, an exemplary embodiment of hydraulic control system 116 for controlling the swing mechanism of machine 100 is shown. In the exemplary embodiment shown in FIG. 2, the swing mechanism includes a closed loop hydraulic circuit 164.

Hydraulic circuit 164 includes a hydraulic motor 130 configured to drive the swing mechanism of machine 100 to rotate counterclockwise (left) or clockwise (right). Hydraulic motor 130 is configured in a known manner to receive hydraulic fluid to effect swinging of superstructure 103 (see FIG. 1) about a vertical axis of machine 100.

Hydraulic circuit 164 further includes a plurality of variable displacement pumps, in the exemplary embodiment, a first variable displacement pump 140A and a second variable displacement pump 140B. Variable displacement pumps 140A, 140B are fluidly connected to hydraulic motor 130 in closed loop hydraulic circuit 164 to supply pressurized hydraulic fluid to hydraulic motor 130. Hydraulic pumps 140A, 140B may be embodied as variable displacement axial piston pumps, and motor 130 may be embodied as a fixed displacement hydraulic motor or a variable displacement hydraulic motor. The speed and torque of hydraulic motor 130 is controlled by adjusting an angle of inclination of respective swash plates (not shown) of variable displacement pumps 140A, 140B. A swash plate angle for each hydraulic pump 140A, 140B may be either positive or negative, corresponding to a flow of hydraulic fluid either counterclockwise or clockwise in closed loop hydraulic circuit 164. Accordingly, hydraulic motor 130 may be operated by variable displacement pumps 140A, 140B to swing superstructure 103 of machine 100 either counterclockwise (swing left) or clockwise (swing right). The swash plate angle of hydraulic pumps 140A, 140B may be controlled by hydraulic actuators 142A, 142B, which will be described in more detail in the following.

Hydraulic actuators 142A, 142B are configured to receive pressurized fluid having a pilot pressure that corresponds to a desired displacement of the associated variable displacement pump 140A, 140B from a pilot valve assembly 143 via hydraulic lines 153, 155, 157 and 159. In the exemplary embodiment shown in FIG. 2, pilot valve assembly 143 may comprise a first pilot valve 144A and a second pilot valve 144B. Pilot valves 144A, 144B may be, for example, electrohydraulic pressure reducing valves or similar valves for generating the pilot pressure. Pilot valves 144A, 144B may be configured to receive pressurized hydraulic fluid from reservoir 112 via a pilot pump 145 and a hydraulic line 147. Pilot pump 145 may be embodied as, for example, a charge pump.

Each hydraulic actuator 142A, 142B may include a piston 141A, 141B disposed in a chamber 137A, 137B, respectively. Pistons 141A, 141B may be biased to a neutral center position in chambers 137A, 137B, respectively, for example, by spring assemblies 139A, 139B. One side of chambers 137A, 137B is fluidly connected to first pilot valve 144A at an input X1 via hydraulic lines 153, 157, respectively, and the opposite side of chambers 137A, 137B is fluidly connected to second pilot valve 144B at an input X2 via hydraulic lines 155, 159, respectively. A pressure difference between the two sides of chambers 137A, 137B results in a movement of pistons 141A, 141B, which in turn results in an adjustment of the angle of the swash plate of the associated variable displacement pump. In case of no pressure difference between the two sides of chambers 137A, 137B, variable displacement pumps 140A, 140B may be in the neutral position, where hydraulic motor 130 is not driven by variable displacement pumps 140A, 140B. By supplying hydraulic fluid having a desired pilot pressure to one side of chambers 137A, 137B via one of inputs X1 and X2, variable displacement pumps 140A, 140B may drive hydraulic motor 130 with a desired working pressure of the hydraulic fluid in closed loop hydraulic circuit 164. The desired working pressure may be derived from a control signal generated by actuation of input device 106 (see FIG. 1) by an operator of machine 100. Control unit 114 (see FIG. 1) may be operatively connected with input device 106 and, for example, pilot pump 145 and/or pilot valves 144A, 144B via communication lines (not shown). Control unit 114 may generate a control signal for, for example, pilot valves 144A, 144B, which results in an appropriate pilot pressure being generated by pilot valves 144A, 144B and being received by hydraulic actuators 142A, 142B to cause hydraulic pumps 140A, 140B to drive hydraulic motor 130 to rotate superstructure 103 of machine 100 with a desired velocity.

In the exemplary embodiment shown in FIG. 2, two variable displacement hydraulic pumps 140A, 140B are arranged in parallel in closed loop hydraulic circuit 164 to supply hydraulic fluid to hydraulic motor 130. It should be appreciated, however, that in other embodiments more than two hydraulic pumps and more than one hydraulic motor may be included in closed loop hydraulic circuit 164, depending on the application. In some embodiments, variable displacement pumps 140A, 140B may have the same configuration and may be controlled in parallel by actuators 142A, 142B having the same configuration and receiving the same pilot pressure from pilot valve assembly 143. In other embodiments, variable displacement pumps 140A, 140B may have different configurations, for example, different sizes, and may be controlled in parallel by actuators 142A, 142B having the same configuration or different configurations. For example, actuators 142A, 142B may have the same behavior, i.e., the same pilot pressure may result in the same adjustment of the swash plate angle of the associated variable displacement pump. In other words, actuation of pilot valves 144A, 144B simultaneously controls the displacement of variable displacement hydraulic pumps 140A, 140B.

A maximum allowable working pressure may be associated with closed loop hydraulic circuit 164. The maximum allowable working pressure may be a pressure at which it can be assured that no components of hydraulic system 108 of machine 100 are damaged. To assure that the maximum allowable working pressure is not exceeded, hydraulic control system 116 includes a pressure regulating device 146. In the exemplary embodiment shown in FIG. 2, pressure regulating device 146 includes a pressure relief valve 162, a shuttle valve 152, a hydraulic line 151 fluidly connecting shuttle valve 152 and pressure relief valve 162, and a hydraulic line 150 fluidly connecting pressure relief valve 162 to reservoir 112. Pressure relief valve 162 may be configured to receive a working pressure in closed loop hydraulic circuit 164 via a shuttle valve 160 disposed parallel to, for example, variable displacement hydraulic pump 140A via a bypass hydraulic line 161, and a hydraulic line 163.

Pressure relief valve 162 may be configured to be in a closed position when the working pressure received form shuttle valve 160 is below a predetermined pressure, for example, 300 bar. In this state, hydraulic lines 153, 155 supplying the hydraulic fluid with the pilot pressure generated by pilot valves 144A, 144B to hydraulic actuators 142A, 142B are fluidly separated from reservoir 112. Accordingly, the pilot pressure set by pilot valves 144A, 144B will be supplied to hydraulic actuators 142A, 142B.

When the working pressure received by pressure relief valve 162 reaches or exceeds the predetermined pressure, which may be a maximum allowable working pressure for closed loop hydraulic circuit 164, pressure relief valve 162 opens to fluidly connect shuttle valve 152 and therefore the hydraulic line of hydraulic lines 153, 155 that supplies the pilot pressure to hydraulic actuators 142A, 142B to reservoir 112. Thereby, the pilot pressure supplied to hydraulic actuators 142A, 142B is limited, even if a higher pilot pressure is to be set by pilot valves 144A, 144B on the basis of the control signal generated by control unit 114. In this manner, further movement of pistons 141A, 141B in accordance with the set pilot pressure is prevented, and the working pressure in closed loop hydraulic circuit 164 is prevented from rising above the maximum allowable working pressure. Once the working pressure in hydraulic circuit 164 returns to a pressure that is below the maximum allowable working pressure, pressure relief valve 162 closes, and the pilot pressure set by pilot valves 144A, 144B is again supplied to hydraulic actuators 142A, 142B without being limited or reduced.

It is also contemplated that, in other embodiments, shuttle valves 152 and 160 may be omitted, and a plurality of pressure relief valves 162 may be used to detect the pressure in closed loop hydraulic circuit 164 and fluidly connect hydraulic lines 153, 155 to reservoir 112 in an appropriate manner.

It will be appreciated that the exemplary control described above results in a synchronous reduction in the pilot pressure for variable displacement hydraulic pumps 140A, 140B, preventing each of variable displacement pumps 140A, 140B from further increasing the working pressure in the system.

It will further be readily appreciated that other ways of controlling the working pressure in closed loop hydraulic circuit 164 can be used in accordance with the present disclosure. For example, instead of limiting the pilot pressure in hydraulic lines 153, 155, 157 and 159 when the working pressure reaches the maximum allowable working pressure, it is possible to limit the pressure of the hydraulic fluid supplied to pilot valves 144A, 144B, for example, by varying the displacement of pilot pump 145. Many different ways of reducing or limiting the pressure of the hydraulic fluid supplied to pilot valves 144A, 144B will readily be apparent to the skilled person. In this case, shuttle valve 152 can be omitted, and pressure relief valve 162 may be fluidly connected between hydraulic line 147 and reservoir 112.

Further, it should be appreciated that, in other exemplary embodiments in accordance with the present disclosure, the working pressure in closed loop hydraulic circuit 164 may be detected in a different manner, for example, by providing a pressure sensor (not shown) in closed loop hydraulic circuit 164. Such a pressure sensor may be connect to control unit 114, and control unit 114 may operate various components of hydraulic control system 116 to limit or reduce the pilot pressure that is supplied to hydraulic actuators 142A, 142B. For example, control unit 114 may be configured to actuate pilot valves 144A, 144B when the maximum allowable working pressure is reached, overriding control signals corresponding to an operation of input device 106 by an operator.

Finally, while hydraulic control system 116 has been described as being associated with a swing mechanism of machine 100, it is also contemplated that hydraulic control system may be used for other hydraulic circuits, for example, hydraulic drive circuits for propelling machine 100 or similar machines.

INDUSTRIAL APPLICABILITY

The industrial applicability of the systems and methods for controlling a plurality of variable displacement pumps of a machine described herein will be readily appreciated from the foregoing discussion. One exemplary machine suited to the disclosure is an excavator such as a large mining excavator. Similarly, the systems and methods described can be adapted to a large variety of machines and tasks.

In accordance with some embodiments, a method of operating a plurality of variable displacement pumps comprises supplying each of a plurality of hydraulic actuators with hydraulic fluid having a pilot pressure corresponding to a desired displacement of each of the plurality of variable displacement pumps, wherein the plurality of variable displacement pumps are fluidly connected in parallel in a closed loop hydraulic circuit and configured to supply at least one hydraulic motor with pressurized hydraulic fluid. The method further comprises receiving a system pressure in the closed loop hydraulic circuit and, when the received system pressure reaches a maximum allowable system pressure, limiting the pilot pressure of hydraulic fluid supplied to the plurality of hydraulic actuators. An exemplary operation of the embodiment shown in FIG. 2 will be described in the following with reference to FIGS. 3 and 4.

Figure 3:
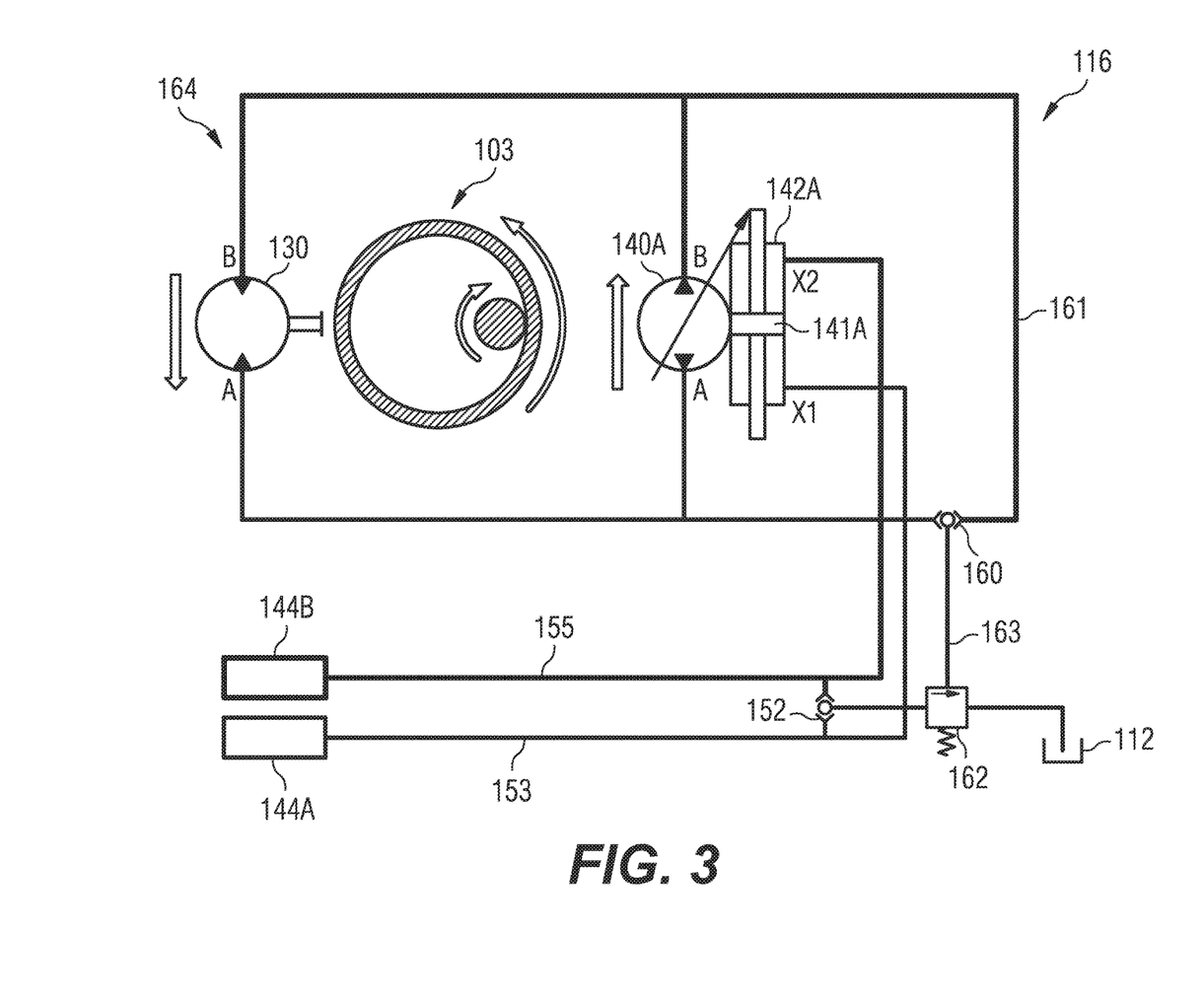
FIG. 3 is a schematic diagram showing details of an exemplary operation of the hydraulic control system of FIG. 2.
Figure 4:
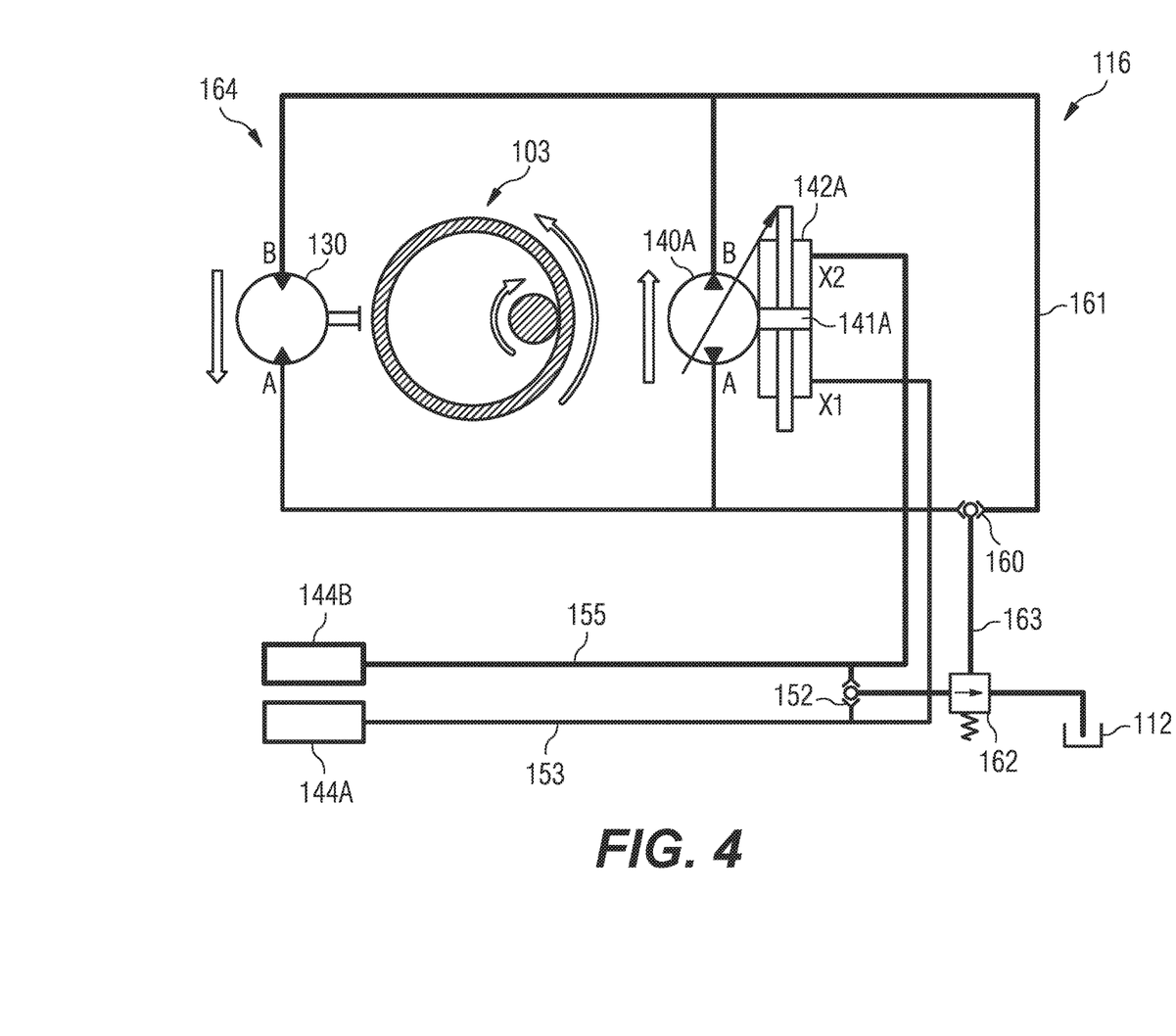
FIG. 4 is another schematic diagram showing details of an exemplary operation of the hydraulic control system of FIG. 2.

FIG. 3 shows part of the hydraulic control system 116 of FIG. 2 in a schematic manner. In FIG. 3, an operator has actuated input device 106 (see FIG. 1) to swing superstructure 103 of machine 100 counterclockwise. Accordingly, control unit 114 will generate a corresponding control signal for pilot valve 144B to supply the appropriate pilot pressure to hydraulic actuators 142A, 142B via input X2. It should be noted that, for the sake of simplicity, only hydraulic actuator 142A and the associated variable displacement pump 140A are shown in FIGS. 3 and 4. Likewise, spring assembly 139A of hydraulic actuator 142A has been omitted. However, it will be readily appreciated that the same pilot pressure is supplied to hydraulic actuator 142B associated with variable displacement pump 140B.

As shown in FIG. 3, as long as the working pressure in hydraulic circuit 164 is below the maximum allowable working pressure, the pilot pressure supplied by pilot valve 144B via hydraulic line 155 will cause piston 141A to move downward, thereby varying the adjustment angle of the swash plate of variable displacement pump 140A. Accordingly, variable displacement pump 140A will circulate hydraulic fluid with a pressure that results in the desired movement of superstructure 103 in closed loop hydraulic circuit 164 (shown by the arrows in FIG. 3). As the system pressure is below the maximum allowable system pressure, pressure relief valve 162 is closed, and hydraulic line 155 is not fluidly connected to low-pressure reservoir 112.

FIG. 4 shows the case where the maximum allowable working pressure has been reached in closed loop hydraulic circuit 164. As shown in FIG. 4, the working pressure received at pressure relief valve 162 causes pressure relief valve 162 to open and to fluidly connect hydraulic line 155 with reservoir 112. Accordingly, the pilot pressure supplied to hydraulic actuator 142A is limited, preventing a further increase in the displacement of variable displacement hydraulic pump 140A. The same applies to variable displacement hydraulic pump 140B, such that all of the variable displacement hydraulic pumps in hydraulic circle 164 are simultaneously controlled to assure that the maximum allowable system pressure is not exceeded.

It should be noted that, with the exemplary embodiment described herein, where hydraulic actuators 142A, 142B are directly controlled by supplying hydraulic fluid with an appropriate pilot pressure to the same, additional advantages can be achieved with respect to the operation of the hydraulic control system 116.

For example, there is a case where, after superstructure 103 of machine 100 has been rotated counterclockwise, the operator releases input device 106, such that input device 106 returns to its neutral position. In this case, no pilot pressure signal is generated, and no pilot pressure is supplied to hydraulic actuators 142A, 142B. Accordingly, pistons 141A, 141B return to their center position, and variable displacement pumps 140A, 140B destroke to their neutral position, thereby creating a braking momentum. Accordingly, movement of superstructure 103 in a counterclockwise direction is slowed down by variable displacement pumps 140A, 140B which now function as a motor. With this construction, movement of superstructure 103 is automatically slowed down when the operator releases input device 106, without the operator having to move input device 106 into the opposite direction to slow down the same. Of course, if a faster braking of the movement of superstructure 103 is desired, the operator may in addition move input device 106 in the opposite direction to actively brake superstructure 103.

Further, in case a negative load acts on hydraulic motor 130, for example, when superstructure 103 is rotating in a counterclockwise direction, such a negative load cannot accelerate the rotation of superstructure 103 to be faster than desired and determined by the generated pilot pressure, because the generated pilot pressure results in a defined pump stroke, which would brake the system when such a negative load is applied.

It should be appreciated that in the above-described cases the pressure relief valve 162 would still function as a pressure regulating device to assure that under no circumstances the working pressure in closed loop hydraulic circuit 164 exceeds the maximum allowable working pressure.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the scope of disclosure more generally. All methods described herein may perform in any suitable order unless otherwise indicated herein or clearly contradicted by context.

Accordingly, this disclosure includes all modifications and equivalences of the subject-matter recited in the claims appended hereto as permitted by applicable law. Moreover, any combination of the above-described elements in all possible variations thereof is encompassed by the disclosure unless otherwise indicated herein or clearly contradicted by context.

Although the preferred embodiments of this disclosure have been described herein, improvements and modifications may be incorporated without departing from the scope of the following claims.

The invention claimed is:

1. A hydraulic control system, comprising:
a closed loop hydraulic circuit including at least one hydraulic motor and a plurality of variable displacement pumps fluidly connected in parallel in the closed loop hydraulic circuit, the plurality of variable displacement pumps being configured to supply the at least one hydraulic motor with pressurized hydraulic fluid;
a plurality of hydraulic actuators, each of the plurality of hydraulic actuators being associated with one of the plurality of variable displacement pumps and configured to adjust the displacement of the associated variable displacement pump;
a pilot valve assembly configured to supply each of the plurality of hydraulic actuators with hydraulic fluid having a pilot pressure corresponding to a desired displacement of each of the plurality of variable displacement pumps, wherein
the pilot valve assembly includes a first pilot valve configured to supply the pressurized fluid having the pilot pressure to a first input of each of the plurality of hydraulic actuators via a first hydraulic line and a second pilot valve configured to supply the pressurized fluid having the pilot pressure to a second input of each of the plurality of hydraulic actuators via a second hydraulic line; and
a pressure regulating device configured to limit the pilot pressure of the hydraulic fluid supplied to the plurality of hydraulic actuators when a working pressure of hydraulic fluid in the closed loop hydraulic circuit reaches a maximum allowable working pressure.

2. The hydraulic control system of claim 1, wherein the pressure regulating device is configured to limit the pilot pressure of the hydraulic fluid supplied to the plurality of hydraulic actuators by at least one of reducing or limiting the pressure of hydraulic fluid that is supplied to the pilot valve assembly via a supply line and reducing or limiting the pressure of hydraulic fluid in hydraulic lines fluidly connecting the pilot valve assembly to the plurality of hydraulic actuators.

3. The hydraulic control system of claim 1, wherein the pressure regulating device includes a pressure relief valve fluidly connected to the closed loop hydraulic circuit and configured to open when the working pressure reaches the maximum allowable working pressure.

4. The hydraulic control system of claim 3, further comprising a first shuttle valve fluidly connected in parallel to the plurality of variable displacement pumps, wherein the pressure relief valve is fluidly connected to the closed loop hydraulic circuit via the first shuttle valve.

5. The hydraulic control system of claim 1, further comprising a second shuttle valve fluidly connected between the first hydraulic line and the second hydraulic line, wherein the pressure relief valve (162) is fluidly connected to the second shuttle valve and configured to establish a fluid connection between the second shuttle valve and a low-pressure reservoir when the working pressure reaches the maximum allowable working pressure.

6. The hydraulic control system of claim 1, wherein each of the plurality of hydraulic actuators is configured to cause the associated variable displacement pumps to circulate pressurized hydraulic fluid in the closed loop hydraulic circuit in a first direction upon receiving the hydraulic fluid having the pilot pressure at the first input, and an opposite second direction upon receiving the hydraulic fluid having the pilot pressure at the second input.

7. The hydraulic control system of claim 6, wherein each of the plurality of hydraulic actuators includes a movable piston disposed in a chamber of the hydraulic actuator, the movable piston being biased to a neutral position and being configured to move in the chamber from the neutral position towards one side upon receiving the hydraulic fluid having the pilot pressure at the first input, and towards an opposite side upon receiving the hydraulic fluid having the pilot pressure at the second input.

8. The hydraulic control system of claim 1, further comprising a pilot pump configured to supply the pilot valve assembly with pressurized hydraulic fluid.

9. A hydraulic control system, comprising:
- a closed loop hydraulic circuit including at least one hydraulic motor and a plurality of variable displacement pumps fluidly connected in parallel in the closed loop hydraulic circuit, the plurality of variable displacement pumps being configured to supply the at least one hydraulic motor with pressurized hydraulic fluid;
- a plurality of hydraulic actuators, each of the plurality of hydraulic actuators being associated with one of the plurality of variable displacement pumps and configured to adjust the displacement of the associated variable displacement pump;
- a pilot valve assembly configured to supply each of the plurality of hydraulic actuators with hydraulic fluid having a pilot pressure corresponding to a desired displacement of each of the plurality of variable displacement pumps;
- a pressure regulating device configured to limit the pilot pressure of the hydraulic fluid supplied to the plurality of hydraulic actuators when a working pressure of hydraulic fluid in the closed loop hydraulic circuit reaches a maximum allowable working pressure;
- an input device configured to receive an operator input corresponding to a desired output by the at least one hydraulic motor; and
- a control unit operatively coupled to the input device and configured to generate a pilot pressure signal indicating the pilot pressure of the hydraulic fluid to be supplied to the plurality of hydraulic actuators on the basis of the operator input.

10. A machine comprising:
- an engine; and
- the hydraulic control system according to claim 1, wherein the plurality of variable displacement pumps are configured to be powered by the engine.

11. The machine according to claim 10, wherein the machine is a large hydraulic excavator, and the closed loop hydraulic circuit is a swing circuit of the large hydraulic excavator.

12. A method of operating a plurality of variable displacement pumps, the plurality of variable displacement pumps being fluidly connected in parallel in a closed loop hydraulic circuit and configured to supply at least one hydraulic motor with pressurized hydraulic fluid, the method comprising:
- supplying each of a plurality of hydraulic actuators associated with the plurality of variable displacement pumps with hydraulic fluid having a pilot pressure corresponding to a desired displacement of each of the plurality of variable displacement pumps via a pilot valve assembly, wherein the pilot valve assembly includes a first pilot valve and a second pilot valve, and wherein the method further includes supplying the pressurized fluid having the pilot pressure to a first input of each of the plurality of hydraulic actuators via a first hydraulic line using the first pilot valve, and supplying the pressurized fluid having the pilot pressure to a second input of each of the plurality of hydraulic actuators via a second hydraulic line using the second pilot valve; and
- limiting the pilot pressure of the hydraulic fluid supplied to the plurality of hydraulic actuators using a pressure regulating device when a working pressure of hydraulic fluid in the closed loop hydraulic circuit reaches a maximum allowable working pressure.

13. The method of claim 12, further comprising at least one of:
- reducing or limiting the pressure of hydraulic fluid that is supplied to the pilot valve assembly via a supply line;
- reducing or limiting the pressure of hydraulic fluid in hydraulic lines fluidly connecting the pilot valve assembly to the plurality of hydraulic actuators; and
- actuating the pilot valve assembly to provide a reduced or limited pilot pressure for the plurality of hydraulic actuators.

14. The method of claim 12, wherein the pressure regulating device includes a pressure relief valve fluidly connected to the closed loop hydraulic circuit, and wherein the method further includes opening the pressure relief valve when the working pressure reaches the maximum allowable working pressure.

15. The method of claim 12, further including fluidly connecting a first shuttle valve in parallel to the plurality of variable displacement pumps, and fluidly connecting the pressure relief valve to the closed loop hydraulic circuit via the first shuttle valve.

16. The method of claim 12, further including fluidly connecting a second shuttle valve between the first hydraulic line and the second hydraulic line, and fluidly connecting a pressure relief valve to the second shuttle valve and establishing a fluid connection between the second shuttle valve and a low-pressure reservoir when the working pressure reaches the maximum allowable working pressure.

17. The method of claim 16, further including circulating pressurized hydraulic fluid in the closed loop hydraulic circuit in a first direction upon receiving the hydraulic fluid having the pilot pressure at the first input, and circulating pressurized hydraulic fluid in the closed loop hydraulic circuit in an opposite second direction upon receiving the hydraulic fluid having the pilot pressure at the second input.

* * * * *